(No Model.) 7 Sheets—Sheet 3.
H. TERFLOTH.
SHEDDING MECHANISM FOR LOOMS.

No. 466,635. Patented Jan. 5, 1892.

Fig. 3.

(No Model.) 7 Sheets—Sheet 5.
H. TERFLOTH.
SHEDDING MECHANISM FOR LOOMS.

No. 466,635. Patented Jan. 5, 1892.

(No Model.) 7 Sheets—Sheet 6.

H. TERFLOTH.
SHEDDING MECHANISM FOR LOOMS.

No. 466,635. Patented Jan. 5, 1892.

Witnesses:
E. C. Duffy
H. E. Peck

Inventor:
Hermann Terfloth
by O. E. Duffy
Attorney

UNITED STATES PATENT OFFICE.

HERMANN TERFLOTH, OF LAER, GERMANY.

SHEDDING MECHANISM FOR LOOMS.

SPECIFICATION forming part of Letters Patent No. 466,635, dated January 5, 1892.

Application filed November 13, 1890. Serial No. 371,321. (No model.) Patented in Germany July 28, 1888, No. 47,185, and in England December 24, 1888, No. 18,847.

*To all whom it may concern:*

Be it known that I, HERMANN TERFLOTH, a subject of the King of Prussia, residing at Laer, Prussia, Germany, have invented certain new and useful Improvements in Shedding Mechanism for Looms, (for which patents have been granted in Germany, No. 47,185, dated July 28, 1888, and in England, No. 18,847, dated December 24, 1888,) of which the following is a specification.

This invention relates to looms by which woven pattern fabrics may be produced without employing cards; and the said invention particularly refers to what is known as the "Jacquard" apparatus.

Looms constructed according to the hereinafter-described invention have the needle-board or dividing-plate divided into several, and, in fact, as many divisions as there are healds or heddles necessary for the production of the pattern, and each portion of the needle-board or dividing-plate carries as many needles as the corresponding heald or heddle has combs. The needles are worked by the separated needle-boards or dividing-plates, which are lifted and depressed by traveling cam or tappet-carrying chains which have a reversing or return motion, and also by a cylinder, to which a rotative and to-and-fro motion is communicated, all as hereinafter described. The cam-chains determine the pattern for the border and part of the inside piece and travel backward and forward by means of a return movement attached to the frame-work. In certain patterns, however, the chains are only caused to travel forward.

The invention consists in certain novel features of construction and combinations of parts more fully described hereinafter, and particularly pointed out in the claims.

The invention will be readily understood by the following description, having reference to the accompanying drawings.

A is the driving-lever rocking about the fixed pin or fulcrum A', (best seen at Fig. 2,) carried by the frame B. At the front end of this lever there is a connecting-rod $a$, mounted thereon by a pivot-pin $a'$ and connected by a fork and pin at the other end to the knife-lever C. The opposite end of the knife-lever C is pivoted on a bracket-arm $b$, bolted to the opposite side of the frame-work of the machine. The lever A is further connected by a rod $a^2$ with a rock-lever $a^3$, pivoted to the main frame at $a^9$, the opposite end of which is attached to a rod $a^4$, which carries one end of the beam D, Figs. 1 and 4, the other end being pivoted at $c'$ in a forked bracket $c$, bolted to the side frame. The beam D serves as foundation for the lifting-wires and is depressed by the above-mentioned connection with the lever A when the knife-lever C goes up. The rock-lever A further operates (by a rod $a^5$) an arm E', which is mounted on a pivot-shaft E² in the frame-work of the apparatus. A rectangular rocking frame E is mounted at its lower portion on the pivot-shaft E².

Figures 11, 12:
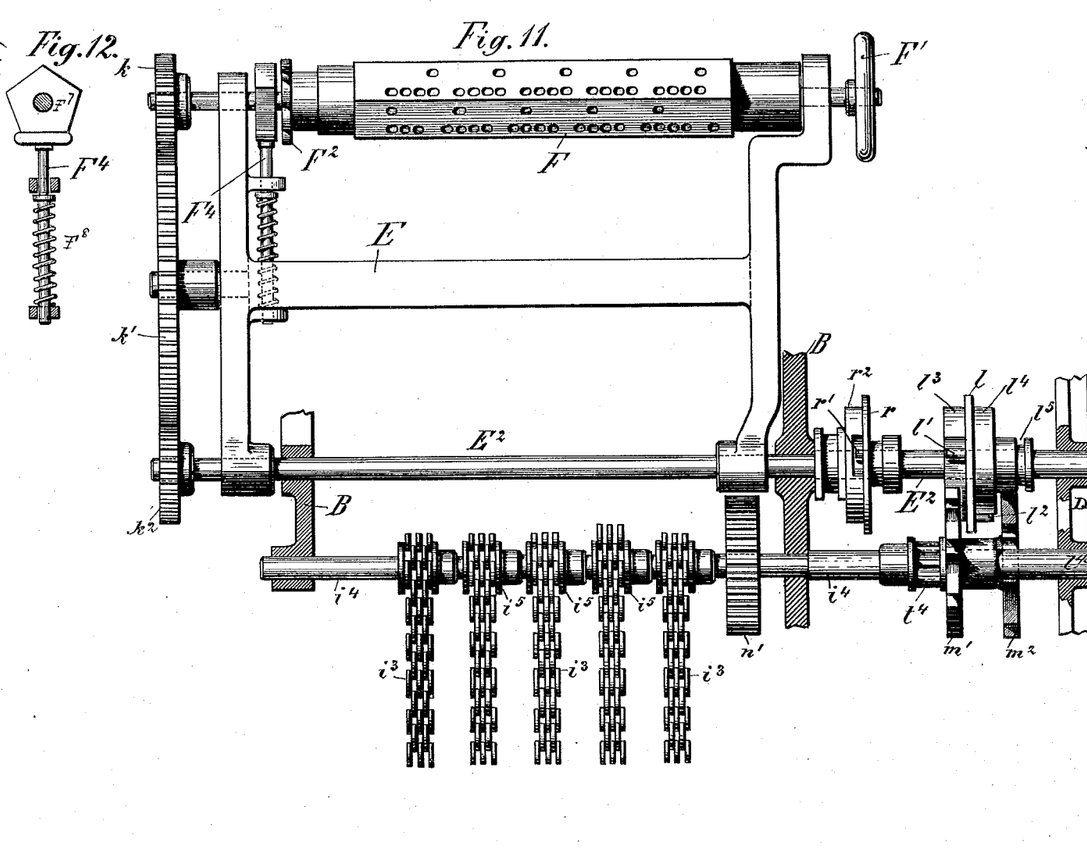
Fig. 11 is a detail sectional elevation taken in the plane of line X' X', Fig. 4.
Fig. 12 is a detail sectional elevation of the spring holding device of the cylinder F.

By operating through the lever A, the rod $a^5$, and arm E' the frame E is rocked to and fro. In the upper part of the frame is carried the cylinder F, which is here five-sided and mounted by studs in journals, one of which studs is provided at one end with a hand-wheel F' and at the other end with a ratchet-wheel F², Fig. 2. There is a hooked pawl F³ mounted on the frame B, and said pawl engages with the ratchet-wheel F², and the to-and-fro motion given to the cylinder F and its frame E causes the said cylinder to be revolved in the usual manner one section of a completed revolution (here onefifth) at a time, and the stoppage of the cylinder is governed in the usual manner through a spring-pressure rod $F^4$, Fig. 12, consisting of a rod having a flat end held yieldingly against wheel $F^7$, rigid on the cylinder-shaft and having five flat faces, by spring $F^8$. Each face of the cylinder F is provided with holes according to the picks required for the fabrics produced. In the arrangement shown in the drawings each face of the cylinder is provided with two rows of holes $e$ and $e'$, (see Figs. 4 and 5,) one above the other. The under row of holes $e'$ (when the cylinder moves toward the lifting-wires) is opposite to the ends of those needles which are not lifted.

The needles $d$ consist each of a wire which is bent in the middle to an eye $d'$, and they are supported in front by the needle-boards or dividing-plates G and at the back by a guide $G'$, and the rear ends of the needles $d$ are bent round in hook form beyond the said guide-holes. A spiral spring $d^2$ is carried upon each needle $d$, by which the needle is always held toward the cylinder. Each expansive spring surrounds its needle and at one end bears against board $G'$ and at its opposite end against eye $d'$ or other suitable stop on the needle. Through the eyes $d'$ of the needles pass the lifting-wires $f$, which are bent at their upper ends somewhat into hook form and at their lower ends into full hooks, which enter apertures in the upper end of what I may call "lifting-blades" $g$, which latter pass through the beam D, and, being provided with shoulders, rest on the same. It is on these lifting-blades $g$ that the "shafts" or heddles hang by means of lashings.

Figure 1:
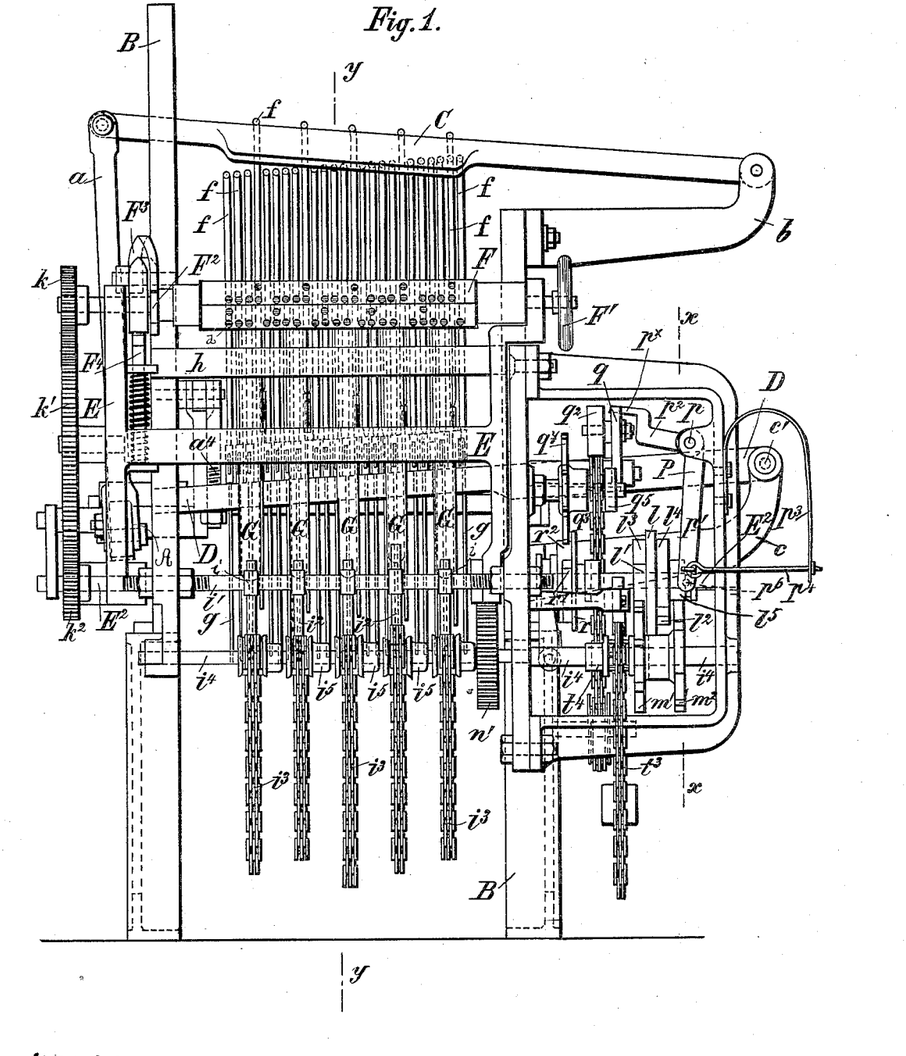
Figure 1 shows a front view of so much of a machine constructed according to my invention as will be here necessary.
Figure 2:
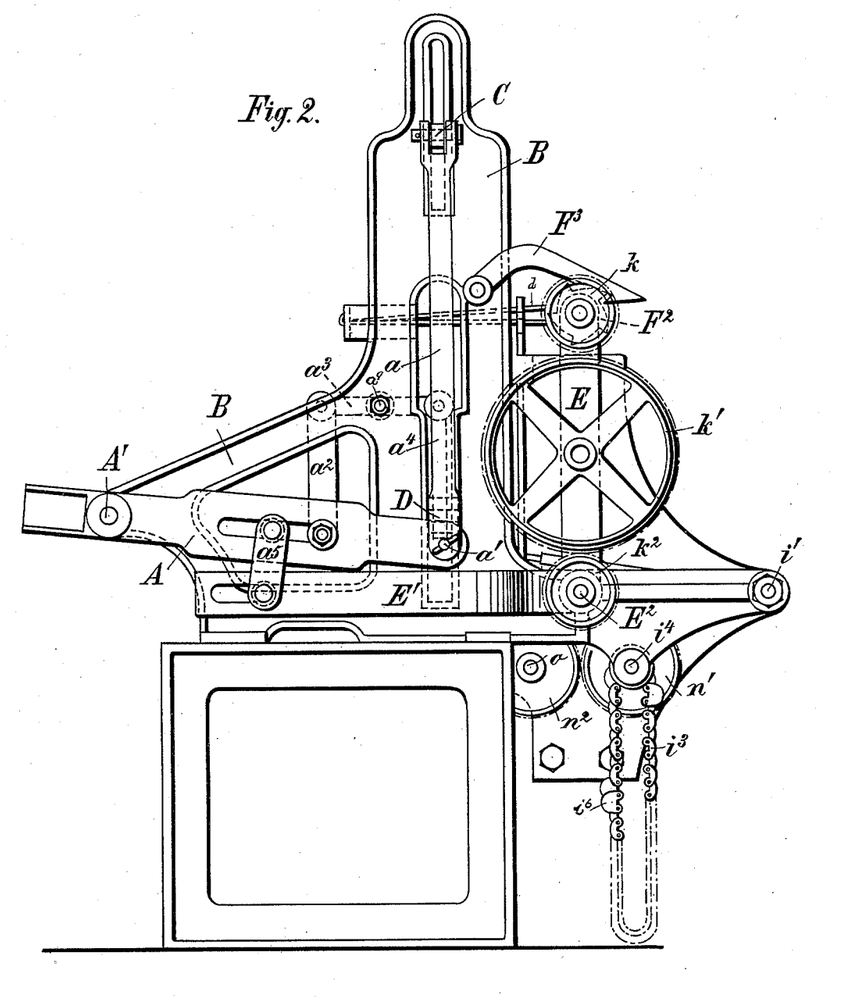
Fig. 2 is a side elevation thereof.
Figure 4:
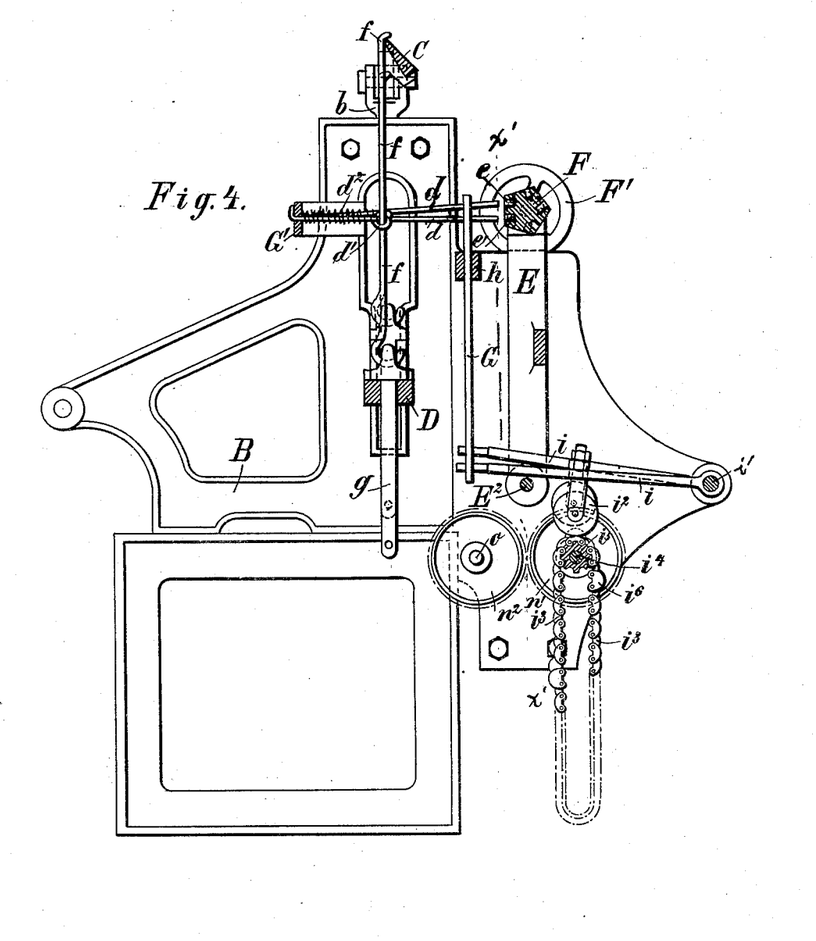
Fig. 4 is a vertical transverse section on the line $y\,y$ of Fig. 1.
Figure 5:
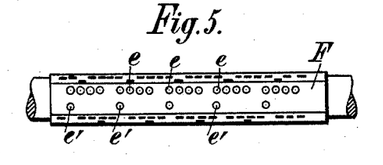
Fig. 5 shows the cylinder or a portion thereof detached and in elevation.
Figure 8:
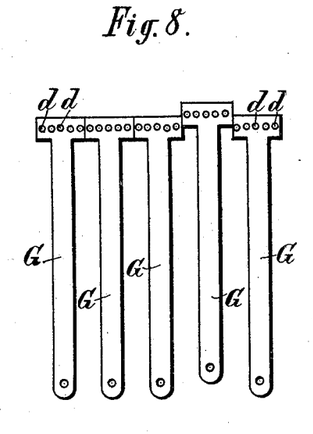
Fig. 8 shows detached and in front elevation the needle-boards or dividing-plates.

The needle-boards or dividing-plates G consist of as many divisions, Figs. 1, 4, and 8, (five being shown on the drawings,) as there are healds or heddles employed for carrying out the pattern, and each of these dividing-plates G contain as many needles (in the drawings five are shown) as the heald or heddle in question has divisions. The plates G are placed movably beside each other in a cross-beam $h$ of the frame, and a hole is formed in the lower end of each, into which the free ends of levers $i$ enter. These levers $i$ are free to rock on a shaft $i'$. Each of the lever-arms $i$ is provided with a roller or bowl $i^2$, which rests on an endless chain $i^3$, which latter passes over chain-rollers $i^5$, mounted on a shaft $i^4$. The chains $i^3$ are arranged according to the pattern to be produced and are provided with raised tappets $i^6$, so that when such raised tappet-link runs over the roller $i^5$ the lever-arm $i$ and the respective needle-board or dividing-plate is raised. By this action the needles $d$, carried or governed by the particular needle-board or dividing-plate in question, are raised so high that their ends come opposite the upper row of holes of the cylinder F. Those needles $d$ which are opposite to the holes in the cylinder F enter therein on the back-stroke of the latter, are not displaced, and their respective lifting-wires are left to be raised on the next following elevation of the knife-lever C, whereas the lifting-wires of the needles which do not come opposite to the holes in the cylinder F are pressed backward out of the reach of the knife-lever C and sink with the descent of the beam D.

The chain-rollers $i^5$ receive motion from the cylinder F in the following manner: Upon the cylinder-shaft, near the ratchet-wheel $F^2$, Fig. 2, there is a spur-wheel $k$, which gears with a larger spur-wheel $k'$, mounted upon a stud-pivot on the frame E. The spur-wheel $k'$ is in gear with spur-wheel $k^2$, mounted on the shaft $E^2$, on which the frame E rocks. The spur-wheels $k$ and $k^2$ are of equal diameter.

Figure 9:
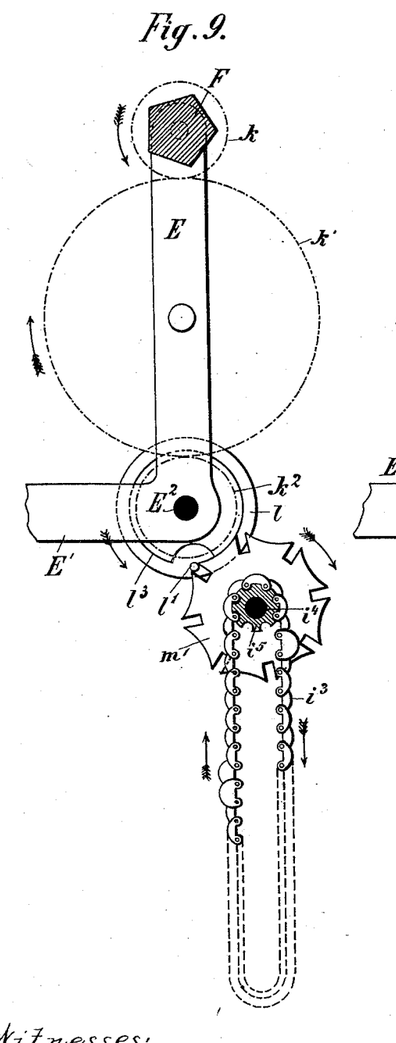
Figs. 9 and 10 are partial diagrammatic detail views showing, respectively, the mechanism which rotates the pattern-chains in opposite directions.
Figure 10:
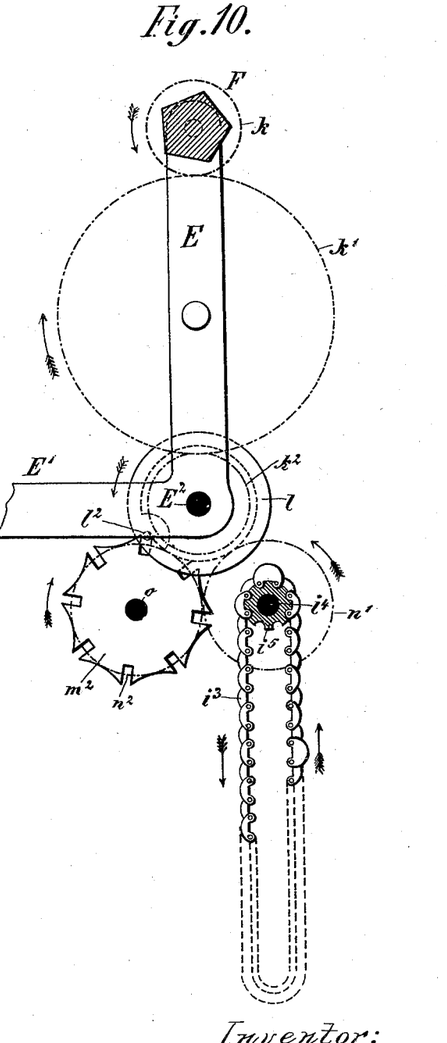

The shaft $E^2$ carries at its opposite end a pivot or pin wheel $l$, Figs. 9 and 10, mounted by means of groove and spring, so as to be capable of being shogged backward and forward along the shaft $E^2$ by means hereinafter described. This pin-wheel $l$ is on each of its opposite faces provided with a pin respectively marked $l'$ and $l^2$, and these pins are caused to gear, as hereinafter described, with one or the other of two star-wheels $m'$ and $m^2$, which are similar to each other in size and shape. The star-wheel $m'$ is keyed on the shaft $i^4$, which carries the chain-rollers $i^5$ and comes opposite one face of the pin-wheel $l$, and the other star-wheel $m^2$ comes opposite the other face of the said pin-wheel and is mounted upon a second parallel shaft $o$, placed at the same height in the frame B as the shaft $i^4$.

Upon the shafts $i^4$ and $o$, respectively, are two spur-wheels $n'$ and $n^2$, Figs. 1, 2, 4, and 7, of equal diameter, so that the shaft $i^4$ and $o$ will turn in opposite directions and at the same rate of speed.

Figure 3:
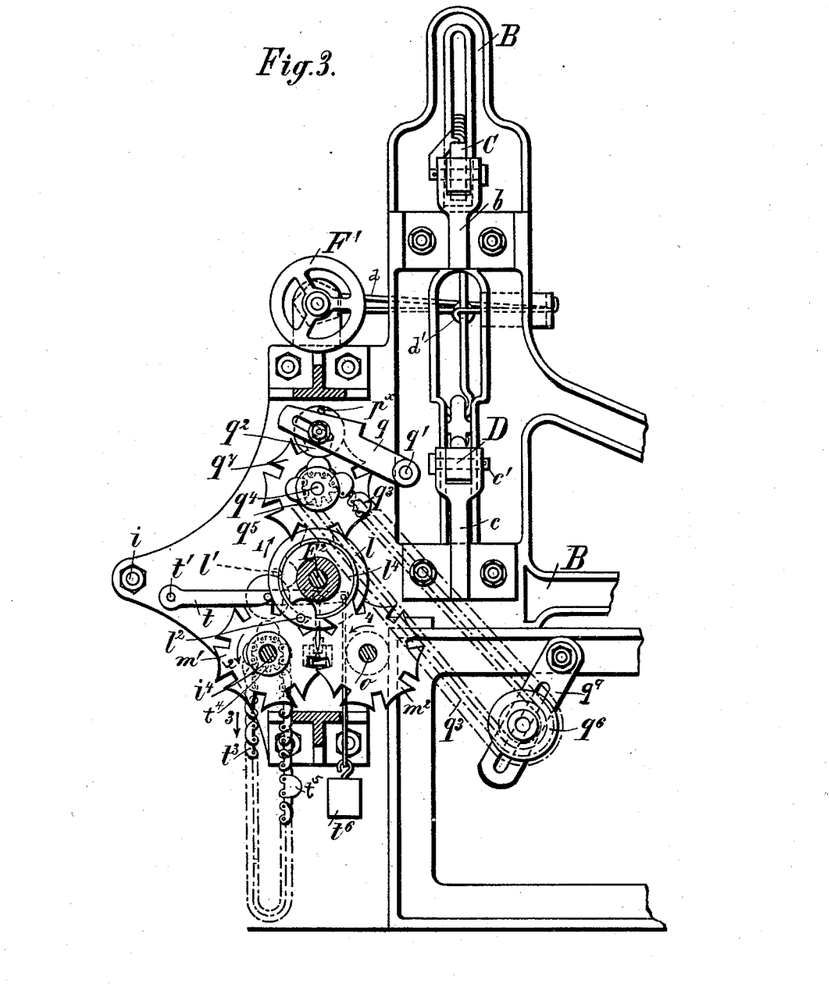
Fig. 3 is a vertical transverse section on the lines $x\,x$ of Fig. 1.

The pin-wheel $l$ (which rotates at the same speed as the cylinder F) acts at each full revolution by its pins $l'$ $l^2$, respectively, on one or the other of the star-wheels $m'$ or $m^2$, moving the same through the space of a cog before the following cog of the star-wheel in question comes into juxtaposition with the faces $l^3$ or $l^4$ of the wheel $l$, whereby the star-wheel is retained until after a repeated full revolution of the wheel $l$, when the pins again grip another cog. For example, if the pin-wheel which revolves in the direction of the arrow, Fig. 3, is in contact with the star-wheel $m'$, as shown in Fig. 1, the said star-wheel $m'$, and with it the shaft $i^4$, is turned in the direction of the arrow 2, Fig. 3, and the cam-chains $i^3$ are moved in the direction of the arrow 3. If the pin-wheel $l$ is now thrown to the right hand, so as to be brought out of contact with the star-wheel $m'$ and into contact with the wheel $m^2$, then the latter, and with it the shaft $o$, will be turned round in the direction of the arrow 4, Fig. 3, and this, by means of the gear-wheels $n'$ $n^2$, will revolve the shaft $i^4$ in the opposite direction of the arrow 2, and consequently the chains $i^3$ will receive an opposite motion to that indicated by the arrow 3.

The pin-wheel $l$ is moved longitudinally upon the shaft $E^2$ upon each alteration of the direction of revolution of the cam-chains by means of a bell-crank lever P, Fig. 1, which rocks on a pin $p$, carried by lugs on the framework. The lower forked arm of this bell-crank lever embraces the hub of the pin-wheel $l$, and has two side pins which project into a circumferential groove on same.

The upper arm $p^2$ of the lever P bears with its end $p^\times$ on a lever $q$, Figs. 1 and 3, mounted and rocking on pin $q'$, and is provided with rollers $q^2$, resting on an endless chain $q^3$, mounted on chain-roller $q^4$ and held extended by roller $q^6$, Fig. 3, mounted in a bracket $q^9$, as shown, secured to the main frame.

Figure 6:
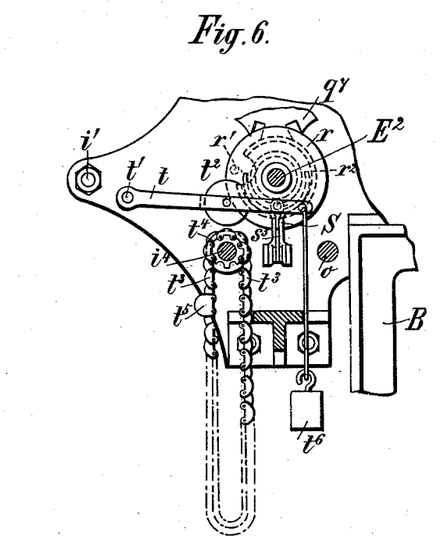
Fig. 6 is a transverse sectional elevation of a portion of the mechanism detached for shogging the pin-wheel.

The chain $q^3$ is made up of raised and depressed links, or what may be called "cam-tappet" links, so that according to what size or shaped link is brought under the roller $q^2$ the lever, and through this the arm $p^2$ of the bell-crank P, is raised or lowered, and in consequence thereof the pivot-wheel $l$ is thrown to the right or to the left. To insure the roller $q^2$ following the variations in size or shape of the links that are to secure the falling down of the lever $q$ from a raised chain-link to one of less size, for the purpose of causing the swinging toward the right of the arm $p'$ of the bell-crank P, a spring $p^3$, Fig. 1, is provided, one end of which is connected with the frame of the machine and the other and outer end by a tension-rod $p^4$ with the said lever-arm $p'$. The spring $p^3$ thus tends to draw the lever-arm $p'$, and with it the pin-wheel $l$, toward the right. The chain-roller $q^5$ receives its motion from the shaft $E^2$. For this purpose there is arranged upon the latter a second wheel $r$, Figs. 1, 6, and 7, mounted so as to have a limited longitudinal movement on the shaft and provided with a side projecting pin $r'$ and a projecting rim or boss $r^2$, which always, after taking up its right or left position, is in or out of gear with a star-wheel $q^7$, Figs. 1, 3, 6, and 7, which forms one piece with the chain-roller $q^5$. The shifting of the pin-wheel $r$ takes place by means of a bell-crank lever S, Fig. 7, an arm $s'$ of which grasps the hub of the wheel $r$, and the other arm $s^2$ is connected by a rod $s^3$ with a lever $t$, Fig. 6. The lever $t$ turns on a pin $t'$ in the frame of the machine and is provided with a roller $t^2$, by means of which it is supported by an endless chain $t^3$, that runs over a chain-roller $t^4$, fastened on the shaft $i^4$. The chain $t^3$ is provided with tappet-cam links in the same manner as the chains $i^3$, so that when such cam-links run over the roller $t^4$ the lever $t$, and through this the lever-arm $s^2$ of the bell-crank S, is raised, and in consequence the other arm thereof $s'$ is pushed toward the left and throws the pin-wheel $r$ into gear with the star-wheel $q^7$, as shown in Fig. 1, and the revolving motion of the shaft $E^2$ will be transferred to the chain $q^3$. When a cam or tappet link $t^5$ of the chain $t^3$ has passed by the roller $t^2$ of the lever $t$, the said roller $t^2$ falls down upon the lower link of the chain $t^3$, this being insured by means of the weight $t^6$, suspended to the lever $t$, Fig. 6. The pin-wheel $r$ is thus pushed toward the right, and so brought out of contact with the star-wheel $q^7$.

Figure 7:
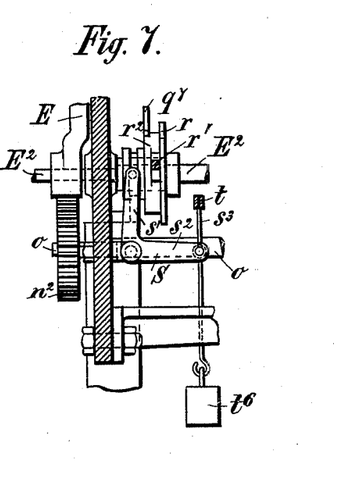
Fig. 7 is a sectional front elevation of the same parts.

The pin-wheel $r$ is shown in end view in Fig. 7, and this wheel has a continuous rotary motion; but so long as the star-wheel $q^7$ occupies the position shown at Fig. 7—that is, while a tooth of the star-wheel is in contact with the continuous portion of the projecting boss $r^2$ of the pin-wheel $r$—it (the star-wheel) will be held stationary, and the pin $r'$ will pass by the said star-wheel without coming into gear therewith.

The working of the described reversing motion is as follows: Let it be supposed that upon the chain-roller $q^5$ and under the roller $q^2$ of the lever $q$ there is a cam-shaped link of the chain $q^3$, which is, for example, of larger size than the ordinary links, so that the pin-wheel $l$ is in gearing with the star-wheel $m'$ of the shaft $i^4$. Upon the chain-roller $t^4$ and under the roller $t^2$ of the lever $t$ there is, say, an ordinary link of the chain $t^3$, so that the pin-wheel $r$ is out of gear with the star-wheel $q^7$ of the chain-roller $q^5$. In this case the pattern or cam-tappet chains $i^3$ will (by the action of the pin-wheel $l$ and of the star-wheel $m'$) be set revolving in the direction of the arrow 2, Fig. 3, (toward the left,) and also the chain $t^3$ revolves in the same direction. The chain $q^3$, on the other hand, stands still. The chain $t^3$ is so arranged that shortly before the said pattern-chains $i^3$ change their direction of revolution a raised or cam link $t^5$ of the chain $t^3$ comes under the roller $t^2$ of the lever $t$, and as a consequence the pin-wheel $r$ comes into gear with the star-wheel $q^7$ and the latter turns a cog farther, so that a lower link of the chain $q^3$ comes to lie under the roller $q^2$ of the lever $q$, and by the bell-crank lever P the pin-wheel $l$ is pushed toward the right and comes into gear with the star-wheel $m^2$, so that now the pattern-chains $i^3$ are made to revolve in the opposite direction, (toward the right.) This is also the case with the chain $t^3$, the raised link $t^5$ of which now again slips off the roller $t^2$ of the lever $t$, whereby the pin-wheel $r$ is again pushed toward the right and brought out of gear with the star-wheel $q^7$, so that now the chain $q^3$ again stands still and the wheel $l$ remains in contact with the star-wheel $m^2$. As soon as another raised link of the chain $t^3$ comes under the roller of the lever $t$ the pin-wheel $r$ comes into gear with the star-wheel $q^7$, and when a raised link of the chain $q^3$ is again brought under the roller of lever $q$ the wheel $l$ comes into gearing with the star-wheel $n'$ and the chains $i^3$ will again revolve in the opposite direction, (toward the left.) This action repeats itself.

I would remark, in conclusion, that when in the fabric to be produced more than two sets of warps, with their respective wefts, are employed more rows of holes are necessary in the cylinder, and also the pattern-chain $i^3$ must contain a similar number of chain-links of different heights; also two or more series of needle-boards or dividing-plates can be arranged one over the other, so as to work with a number of heddles.

It is evident that various changes might be made in the form and arrangements of the parts described without departing from the spirit and scope of my invention. Hence I do not wish to limit myself to the precise construction herein set forth.

Having thus fully described my invention, what I claim, and desire to secure by Letters Patent of the United States, is—

1. In looms, the combination of the cylinder F, having rocking and rotating movement, separate needle-boards or dividing-plates G, tappet or pattern chains separately operating said boards, needles $d$, passing through said boards or plates, lifting-wires $f$, provided with lifting-blades $g$, beam D, knife-lever C, and mechanism for operating said parts, substantially as set forth.

2. A loom having separate needle-boards or dividing-plates, each having a suitable number of needles loosely passing therethrough, and operating means for separately operating such boards or plates, substantially as described.

3. In combination, the loosely-mounted needles, the separate vertically-movable needle-boards or dividing-plates, each having a series of needles passing loosely therethrough, the cylinder operating in conjunction with said needles, and the tappet or pattern chains for operating said boards or plates, substantially as described.

4. The combination, with the needles, of the tappet or pattern chains, the means operating the needles and controlled by said chains, comprising movable needle-boards, and the cylinder also acting upon said needles and connected and operating simultaneously with said chains.

5. The combination, with the shaft carrying the tappet or pattern chains and mechanism for rotating said shaft in opposite directions, a tappet-chain on said shaft, and means controlled by said chain to alternately throw said mechanisms into gear with said shaft to reverse the direction of movement of the same, substantially as described.

6. In combination, the shaft carrying the pattern or tappet chains, gearing for rotating the shaft in opposite directions, a tappet-chain carried by said shaft, a lever controlled by said chain, another tappet-chain thrown into or out of gear with its driving means by said lever, and means, substantially as described, controlled by said last-mentioned chain to alternately throw gearing into connection with said shaft to rotate the same in opposite directions.

7. In a loom, the combination of a cylinder, such as F, a series of movable needles coacting therewith, the series of separate dividing-plates, a series of needles passing through each, and the traveling pattern-chains, each arranged to separately move a dividing-plate, substantially as described.

8. In a loom, the combination of the frame, swinging knife-lever C, swinging beam D, swinging frame E, connections between said lever, beam, and frame, a swing-lever A to operate said parts, the rotary cylinder carried by frame E, the lifting-wires arranged to be lifted by such lever C, the blades $g$, separately carried by such wires and passing through beam D, the loosely-mounted needles acting in conjunction with such cylinder, the pattern-chains, and interposed mechanism controlling the vertical movement of such needles and operating connections.

In testimony whereof I have signed my name to this specification in the presence of two subscribing witnesses.

HERMANN TERFLOTH.

Witnesses:
 FRANS ARCKENOV,
 W. G. GERLACH.